United States Patent
Dong et al.

(10) Patent No.: US 10,140,543 B2
(45) Date of Patent: Nov. 27, 2018

(54) MEDICAL IMAGE PROCESSING APPARATUS, MEDICAL IMAGE PROCESSING METHOD, AND MEDICAL IMAGING DEVICE

(71) Applicant: Toshiba Medical Systems Corporation, Otawara-shi (JP)

(72) Inventors: Qiuying Dong, Beijing (CN); Jin Xu, Beijing (CN); Pengfei Liu, Beijing (CN); Jianchun Zhao, Beijing (CN); Kensuke Shinoda, Otawara (JP); Yasuo Sakurai, Nasushiobara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 125 days.

(21) Appl. No.: 15/086,759

(22) Filed: Mar. 31, 2016

(65) Prior Publication Data
US 2016/0292853 A1    Oct. 6, 2016

(30) Foreign Application Priority Data

Apr. 3, 2015   (CN) .......................... 2015 1 0159188
Jan. 19, 2016  (JP) ................................ 2016-008271

(51) Int. Cl.
G06K 9/00     (2006.01)
G06K 9/36     (2006.01)
G06T 7/11     (2017.01)
G06T 7/12     (2017.01)

(52) U.S. Cl.
CPC .................. *G06K 9/36* (2013.01); *G06T 7/11* (2017.01); *G06T 7/12* (2017.01); *G06T 2207/30012* (2013.01)

(58) Field of Classification Search
CPC .... G06K 9/36; G06T 7/12; G06T 7/11; G06T 2207/30012
See application file for complete search history.

(56) References Cited

U.S. PATENT DOCUMENTS

| | | | |
|---|---|---|---|
| 6,249,590 B1 * | 6/2001 | Young ...................... | G06T 7/70 348/169 |
| 6,608,916 B1 | 8/2003 | Wei et al. | |
| 7,046,830 B2 | 5/2006 | Gerard et al. | |
| 7,561,728 B2 | 7/2009 | Abufadel et al. | |
| 7,672,493 B2 | 3/2010 | Qing et al. | |
| 8,953,865 B2 * | 2/2015 | Goto ..................... | G06T 1/0007 382/132 |
| 2007/0127799 A1 * | 6/2007 | Reisman ................... | G06T 7/73 382/128 |
| 2010/0177946 A1 | 7/2010 | De Bruijne et al. | |

FOREIGN PATENT DOCUMENTS

JP          7-51248        2/1995

* cited by examiner

*Primary Examiner* — Shefali Goradia
(74) *Attorney, Agent, or Firm* — Oblon, McClelland, Maier & Neustadt, L.L.P.

(57) ABSTRACT

A medical image processing apparatus according to an embodiment includes a reception unit and a detection unit. The reception unit is configured to receive two points specified on at least one sagittal image. The detection unit is configured to detect an intervertebral disc by evaluating a luminance distribution within a region that includes the two points.

14 Claims, 8 Drawing Sheets

MEDICAL IMAGE PROCESSING APPARATUS, MEDICAL IMAGE PROCESSING METHOD, AND MEDICAL IMAGING DEVICE

CROSS-REFERENCE TO RELATED APPLICATION

This application is based upon and claims the benefit of priority from Chinese Patent Application No. 201510159188.9, filed on Apr. 3, 2015, and Japanese Patent Application No. 2016-008271, filed on Jan. 19, 2016; the entire contents of which are incorporated herein by reference.

FIELD

Embodiments described herein relate to a medical image processing apparatus, a medical image processing method and a medical imaging device.

BACKGROUND

It is common in the medical image processing field to detect a target object from a medical image. For example, it is of important clinical significance to detect an intervertebral disc from a medical image of a human body. The setting of a section for taking the image of an intervertebral disc is extremely time-consuming in medical spine examinations. On this account, as a conventional technology, an automatic scan planning method has been developed to automatically set a section for taking the image of an intervertebral disc. First, a sagittal plane image and/or a coronal plane image which are/is generally relatively low in quality are/is acquired through blind scan, and an intervertebral disc is detected from the sagittal plane image and/or the coronal plane image of relatively low quality. Then, the scanning of an intervertebral disc is planned using information of the detected intervertebral disc such as the position and the direction of the detected intervertebral disc, so that a subsequently performed intervertebral disc scan can be performed on an image of higher quality.

Fully automatic intervertebral disc detection technologies are available as conventional techniques, but it is still needed to provide a more accurate and more robust intervertebral disc detection technology.

Embodiments described herein are directed to providing a medical image processing apparatus, a medical image processing method and a medical imaging device that are capable of more accurately detecting an intervertebral disc.

A medical image processing apparatus according to an embodiment includes a reception unit and a detection unit. The reception unit is configured to receive two points specified on at least one sagittal image. The detection unit is configured to detect an intervertebral disc by evaluating a luminance distribution within a region that includes the two points.

DETAILED DESCRIPTION

Figure 1:
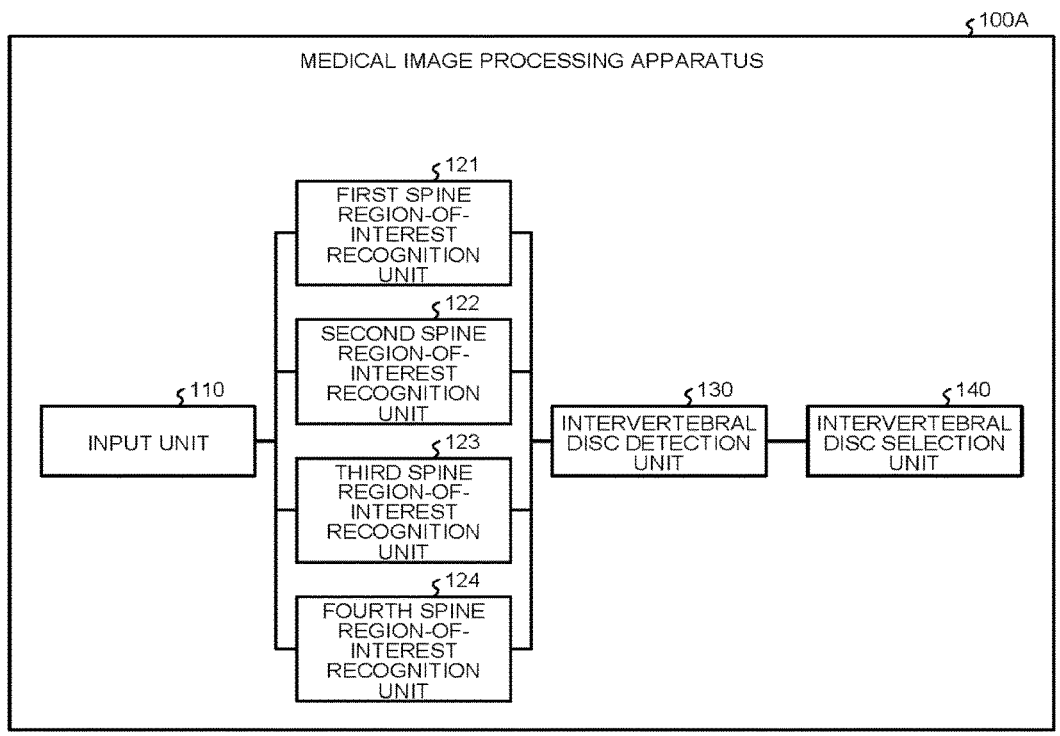
FIG. 1 is a block diagram illustrating a medical image processing apparatus according to an embodiment.

The following presents a simplified summary of embodiments to provide a basic understanding of the embodiments. It should be appreciated that the simplified summary, which is not the exhaustive overview of the embodiments, is not intended to identify the key or critical parts of the embodiments or limit the scope of the embodiments, but merely to present some concepts in a simplified form as a prelude to the more detailed description that is presented later.

It is an object of the present embodiments to provide a medical image processing apparatus, a medical image processing method and a medical imaging device that are capable of more accurately detecting an intervertebral disc.

In accordance with an embodiment, a medical image processing apparatus is provided which includes: a reception unit configured to receive two points specified on a sagittal plane image; and a detection unit configured to detect an intervertebral disc by evaluating a luminance distribution within a region that includes the two points.

In accordance with another embodiment, a medical processing method is provided which includes: receiving two points specified on a sagittal plane image; and detecting an intervertebral disc by evaluating a luminance distribution within a region that includes the two points.

In accordance with yet another embodiment, a medical imaging device is provided which includes the foregoing medical image processing apparatus.

Further, in accordance with still another embodiment, a computer program for implementing the foregoing medical image processing method is provided.

Further, in accordance with yet still another embodiment, a computer program product at least in a non-transient computer-readable medium form is provided on which computer program codes for implementing the medical image processing method are recorded.

In the method, the apparatus and the device according to the present embodiments, four groups of intervertebral discs are detected from four spine regions of interest determined through four rounds of recognition, and the group of intervertebral discs which best meets a predetermined evaluation standard is selected from the four groups of intervertebral discs as an intervertebral disc detection result, wherein in the fourth round of recognition, spine region-of-interest segmentation is carried out by taking the two points input by the user as reference boundary positions. Therefore, the method, the apparatus and the device according to the present embodiments are capable of detecting an intervertebral disc more accurately so that a subsequently performed spine scan can be performed on an image of higher quality.

The present embodiments will be better understood with reference to the following description when taken in conjunction with accompanying drawings in which identical or like reference signs denote identical or like components. The objectives, features, and advantages of the present embodiments will be better understood with reference to following description when taken in conjunction with the accompanying drawings. The accompanying drawings, together with the detailed description below, are incorporated into and form a part of the specification and serve to illustrate, by way of example, preferred embodiments of the present invention and to explain the principle and advantages of the present invention. In the accompanying drawings, identical or like reference signs denote identical or like components.

Embodiments

The present embodiments are described below with reference to the accompanying drawings. The components and features described in an accompanying drawing or embodiment of the present invention can be combined with those shown in one or more other accompanying drawings or embodiments. It should be noted that for the sake of clarity, representation and description of the components and processing that are unrelated to the present embodiments and well known to those of ordinary skill in the art are omitted in the accompanying drawings and description.

As stated above, it is of important clinical significance to detect an intervertebral disc from a medical image of a human body. Anatomically, a sagittal plane is a section which passes from anterior to posterior, dividing a human body into right and left halves. A coronal plane is a section which passes from left to right, dividing a human body into anterior and posterior halves. A transverse plane is a section which divides a human body into upper and lower halves along the horizontal direction. Accordingly, the image obtained by scanning a human body along an anterior-posterior direction is referred to as a sagittal plane image (or sagittal image). The image obtained by scanning a human body along a left-right direction is referred to as a coronal plane image (or coronal image). The image obtained by scanning a human body along the horizontal direction is referred to as a transverse plane image. The foregoing scan may be a scan performed on a human body by using an existing medical imaging device, for example, a magnetic resonance scan.

An intervertebral disc is detected from a sagittal plane image and/or a coronal plane image obtained through blind scan, and then the scanning of an intervertebral disc is planned using information of the detected intervertebral disc, for example, the position and the direction of the detected intervertebral disc, so that a subsequently performed scan of an intervertebral disc can be performed on an image of higher quality. Information such as the position and the direction of an intervertebral disc can be accurately obtained through accurate intervertebral detection to be described later, which is performed for making it easy to accurately carry out a scanning plan later.

FIG. 1 is a block diagram schematically illustrating a medical image processing apparatus according to an embodiment. As shown in FIG. 1, a medical image processing apparatus 100A includes an input unit 110, a first spine region-of-interest recognition unit 121, a second spine region-of-interest recognition unit 122, a third spine region-of-interest recognition unit 123, a fourth spine region-of-interest recognition unit 124, an intervertebral disc detection unit 130 and an intervertebral disc selection unit 140. The input unit 110 is configured to receive two points specified on at least one sagittal plane image. For example, the input unit 110 is configured to receive two points specified by the user on a sagittal plane image obtained by scanning a body. The input unit 110 is also referred to as a reception unit because it receives points. Here, the sagittal plane is a sagittal plane image obtained by scanning a body. Generally, the user can specify the two points on a sagittal plane image which is selected from a series of sagittal plane images obtained by scanning a body and in which a spine image of relatively high quality is contained. For example, the user can specify the two points on a sagittal plane image containing a relatively clear spine image, a sagittal plane image containing a relatively complete spine, or a sagittal plane image passing through the central part of a spine.

The first spine region-of-interest recognition unit 121 is configured to perform, using a first method, fully automatic spine region-of-interest segmentation on the sagittal plane image on which the user inputs two points so as to determine a first spine region of interest. The second spine region-of-interest recognition unit 122 is configured to perform fully automatic spine region-of-interest segmentation on the sagittal plane image using a second method so as to determine a second spine region of interest. The third spine region-of-interest recognition unit 123 is configured to perform fully automatic spine region-of-interest segmentation on the sagittal plane image using a third method so as to determine a third spine region of interest. Fully automatic spine region-of-interest segmentation refers to segmentation in which, for example, a spine is extracted as a region of interest. That is, the first spine region-of-interest recognition unit 121 performs the segmentation to extract the spine as a region of interest from the sagittal plane image on which the user inputs two points and determine the extracted region of interest to be a first spine region of interest; the second spine region-of-interest recognition unit 122 performs the segmentation to extract the spine as a region of interest from the sagittal plane image and determine the extracted region of interest to be a second spine region of interest; and the third spine region-of-interest recognition unit 123 performs the segmentation to extract the spine as a region of interest from the sagittal plane image and determine the extracted region of interest to be a third spine region of interest. The first to the third spine region-of-interest recognition units 121 to 123 thus determine the respective spine regions of interest. The first spine region-of-interest recognition unit 121, the second spine region-of-interest recognition unit 122, and the third spine region-of-interest recognition unit 123 are hence also referred to as a first determination unit, a second determination unit, and a third determination unit, respectively. Here, the first method, the second method, and the third method to which no limitation is given may be optional existing proper methods for performing fully automatic spine region-of-interest segmentation. Examples of the first method, the second method, and the third method are given below for the sake of illustration.

In an example, the first method may include: estimating an intervertebral disc according to angular limitations to intervertebral discs, and determining a first spine region of interest using the vertical projection of the estimated intervertebral disc. Here, the vertical projection of the intervertebral disc is, for example, a luminance (signal value) distribution corresponding to an intervertebral disc in a sagittal plane image along an anterior-posterior direction, and is obtained by calculating, with respect to each position along an axis in the anterior-posterior direction (an anterior-posterior axis), a sum of luminance taken along a craniocaudal direction. The anterior-posterior direction and the craniocaudal direction correspond to the horizontal direction of the sagittal plane image and the vertical direction of the sagittal plane image, respectively. For example, in the first method, gradient of the sagittal plane image are calculated; an intervertebral disc is recognized from the gradient map of the sagittal plane image according to the angular limitations to intervertebral discs; the recognized intervertebral disc is fused with an intervertebral disc which is roughly recognized from several sagittal plane images next the sagittal plane image; and the gradient map obtained from a result of the fusing is vertically projected to estimate an outline surrounding each intervertebral disc as a first spine region of interest.

For example, in the first method, edges of the sagittal plane image are calculated; an intervertebral disc is recognized from an edge-enhanced image of the sagittal plane image according to the angular limitations to intervertebral discs; the recognized intervertebral disc is fused with an intervertebral disc which is roughly recognized from several sagittal plane images next to the sagittal plane; and an edge-enhanced image obtained as a result of the fusing is vertically projected to estimate an outline surrounding each intervertebral disc as a first spine region of interest. Here, for example, a spine including intervertebral discs runs in the craniocaudal direction and hence has luminance different from that of abdominal tissue and the like. Therefore, in the first method, the luminance distribution in the anterior-posterior direction obtained by vertically projecting the edge-enhanced image is used, from which a range having luminance distributed differently from the surrounding regions in the anterior-posterior direction is estimated as a first spine region of interest.

In an example, the second method may include: adjusting a first spine region of interest according to the position relationship between predetermined parts of the first spine region of interest a as to determine a second spine region of interest. As a spine extends towards a given direction, there is a certain position relationship between different parts of the spine. The first spine region of interest may be adjusted according to whether predetermined parts of the first spine region of interest meet the inherent position relationship between the parts of the spine. Specifically, in the second method, a first spine region of interest may divided into a given number of parts, for example, six parts in the vertical direction of a spine. It is determined whether the offset between the center of the gradient of each part and that of the gradient of another part adjacent thereto exceeds a predetermined threshold. If the offset exceeds a predetermined threshold, then the boundary of the first spine region of interest at the side of the center of the gradient of the part is adjusted towards the direction of the center of the gradient of the foregoing adjacent part. The finally adjusted first spine region of interest is then used as a second spine region of interest. Here, a gradient for example, an edge.

In an example, the third method may include: detecting a spinal canal and determining a third spine region of interest based on the position relationship between an intervertebral disc and a spinal canal. Typically, an intervertebral disc exists in an area to the left of a spinal canal in a sagittal plane image. Thus, after a spinal canal is detected, a third spine region of interest can be determined based on the position relationship between an intervertebral disc and the spinal canal. For example, an area of a given size is determined as a third spine region of interest based on a spinal cavity and by using the state of a spinal canal of serving as the right border of the third spine region of interest or the state of the spinal cavity of being located at a predetermined position to the right of the center of the third spine region of interest.

Three rounds of spine region-of-interest segmentation are carried out using three different methods to obtain a first region of interest, a second region of interest, and a third spine region of interest, respectively, so that the first region of interest, the second region of interest, and the third spine region of interest can be used together with a fourth spine region of interest described below, which is obtained in a subsequent step S224, to detect a plurality of groups of intervertebral discs.

The fourth spine region-of-interest recognition unit 124 is configured to perform spine region-of-interest segmentation on the sagittal plane image containing the two points by taking the two points as reference boundary positions, thus determining a fourth spine region of interest. That is, the fourth spine region-of-interest recognition unit 124 extracts a spine as a region of interest from the sagittal plane image containing the two points and determines the extracted region of interest to be a fourth spine region of interest. The fourth spine region-of-interest recognition unit 124 thus determines a fourth spine region of interest, and is hence also referred to as a fourth determination unit.

The intervertebral disc detection unit 130 is configured to detect a group of intervertebral discs in each of the first to the fourth spine regions of interest. The intervertebral disc detection unit 130 can detect an intervertebral disc from each spine region of interest using any existing proper method. The intervertebral disc detection unit 130 is also referred to as a detection unit.

The intervertebral disc selection unit 140 is configured to select, from the groups of intervertebral discs detected by the intervertebral disc detection unit 130, the group of intervertebral discs best meeting a predetermined evaluation standard as an intervertebral disc detection result. The predetermined evaluation standard may be an evaluation standard which is set by the user according to the needs of the user, for example, according to the requirements of the user on the number of intervertebral discs included in a group of intervertebral discs and on the clarity of intervertebral discs included in a group of intervertebral discs.

Figure 2:
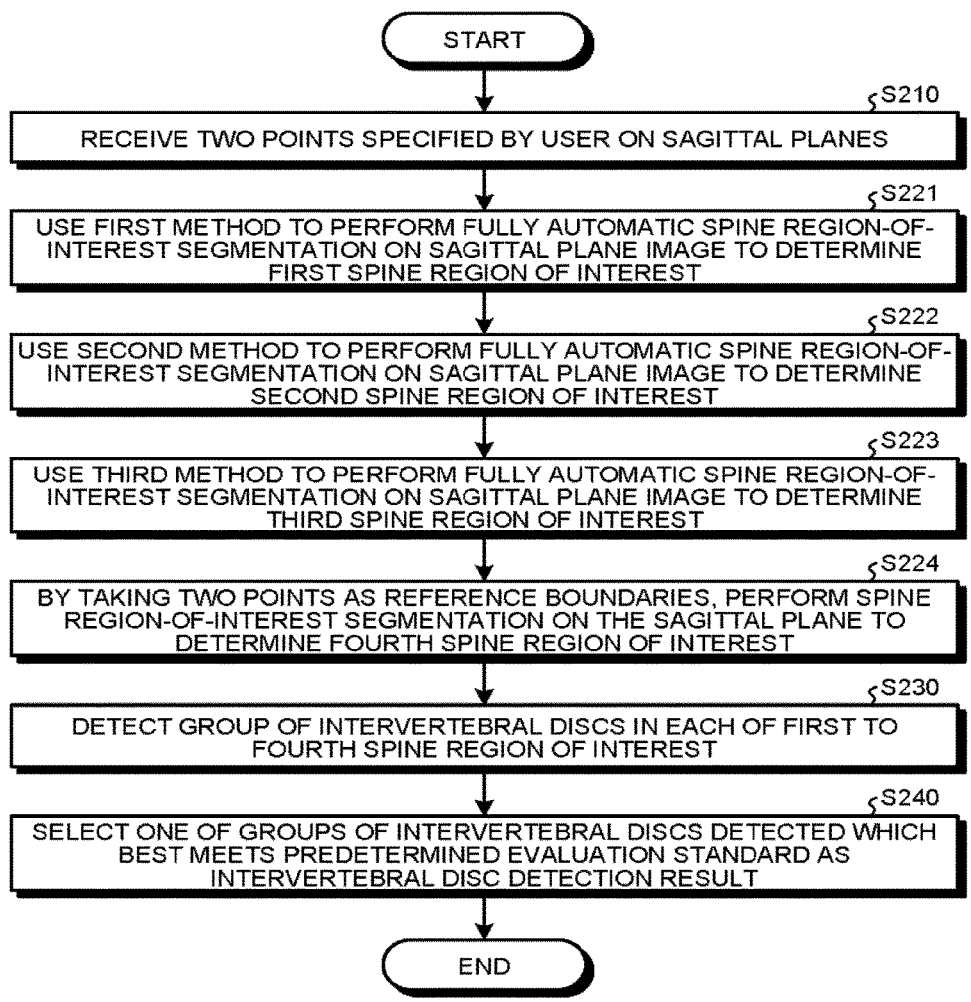
FIG. 2 is a flowchart schematically illustrating the working process of the medial image processing apparatus shown in FIG. 1.

FIG. 2 is a flowchart illustrating the working process of the medical image processing apparatus shown in FIG. 1, that is, a flowchart illustrating a medical image processing method according to an embodiment. As shown in FIG. 2, in step S210 in a medical image processing method P200, two points specified by the user on a sagittal plane image are received. In steps S221, S222, and S223, fully automatic spine region-of-interest segmentation is separately performed on the sagittal plane image on which the two points are specified using a first method, a second method, and a third method to determine a first region of interest, a second region of interest, and a third spine region of interest, respectively. In step S224, spine region-of-interest segmentation is performed on the sagittal plane image by taking the two points as reference boundary positions, thus determining a fourth spine region of interest. In step S230, a group of intervertebral discs is detected in each of the first to the fourth spine regions of interest. In step S240, the one of the groups of intervertebral discs detected which best meets a predetermined evaluation standard is selected as an intervertebral disc detection result.

Here, for example, step S210 may be executed by the input unit 110, step S221 may be executed by the first spine region-of-interest recognition unit 121, step S222 may be executed by the second spine region-of-interest recognition unit 122, step S223 may be executed by the third spine region-of-interest recognition unit 123, step S224 may be executed by the fourth spine region-of-interest recognition unit 124, step S230 may be executed by the intervertebral disc detection unit 130, and step S240 may be executed by the intervertebral disc selection unit 140.

Specific details of each step of the medical image processing method P200 can be understood with reference to the description on each unit of the foregoing medical image processing apparatus 100A. Specific details of each step of the medical image processing method P200 are therefore not described here repeatedly.

In embodiments of the foregoing medical image processing apparatus and the foregoing medical image processing method, four rounds of spine region-of-interest segmentation are performed on the same sagittal plane image to obtain four spine regions of interest, four groups of intervertebral discs are detected from the four spine regions of interest, and the one of the four groups of intervertebral discs which best meets a predetermined evaluation standard is selected as an intervertebral disc detection result. In this way, the problem is addressed that an inaccurate intervertebral disc is detected because the segmentation of a spine region of interest through one round of spine region-of-interest segmentation is not accurate, thus providing a more accurate intervertebral disc detection result.

Figure 3:
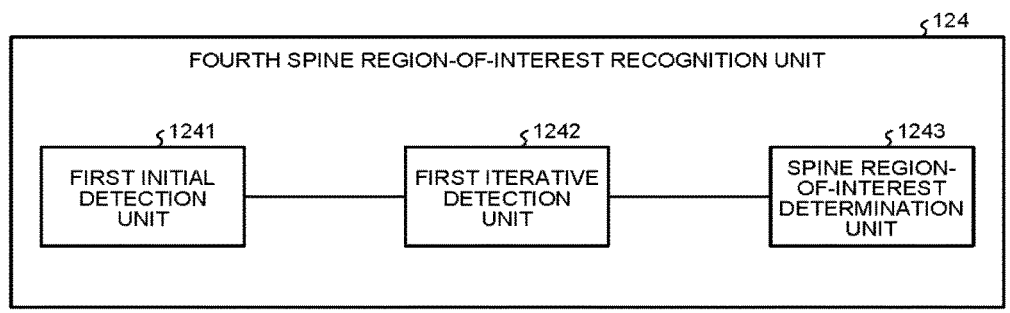
FIG. 3 is a block diagram illustrating a fourth spine region-of-interest recognition unit according to an embodiment.

In the foregoing embodiments, the fourth spine region-of-interest recognition unit 124 detects an intervertebral disc by evaluating a luminance distribution within a region that includes the two points specified. For example, the fourth spine region-of-interest recognition unit 124 can perform, using various proper methods, spine region-of-interest segmentation with reference boundaries specified. For example, a rectangle which takes the two points as its boundaries and has a specific aspect ratio may be directly used as the fourth spine region of interest. As an example but not a limitation, in an embodiment, the fourth spine region-of-interest, recognition unit 124 determines a fourth spine region of interest by iteratively detecting an intervertebral disc by taking the two points input by the user as boundaries. FIG. 3 is a block diagram illustrating a fourth spine region-of-interest recognition unit according to an embodiment. As shown in FIG. 3, the fourth spine region-of-interest recognition unit 124 includes a first initial detection unit 1241, a first iterative detection unit 1242 and a spine region-of-interest determination unit 1243.

The first initial detection unit 1241 is configured to detect an intervertebral disc starting from the position of one of the two points. For example, the first initial detection unit 1241 detects an intervertebral disc containing the point or closest to the point using an existing intervertebral disc detection method.

The first iterative detection unit 1242 is configured to iteratively detect a next intervertebral disc towards the direction of the other one of the two points until the other point is covered (masked) by the next intervertebral disc detected or by the surrounding areas of the next intervertebral disc detected or until the next intervertebral disc detected overlaps with an initial intervertebral disc detected according to the other point. Typically, intervertebral discs are arranged relatively regularly. The position relationship between adjacent intervertebral discs is roughly determined, for example, adjacent intervertebral discs are substantially parallel to each other, and the spaces between intervertebral discs are nearly equal. Besides, the intervertebral discs in a spine substantially have the same form. The form information of an intervertebral disc includes, but is not limited to: the shape, the size and the angle of the intervertebral disc. The position of an intervertebral disc can be represented by, for example, the coordinates of the pixel in the center of the intervertebral disc. Therefore, according to the position information and the form position of a detected intervertebral disc, the next intervertebral disc can be iteratively detected.

The spine region-of-interest determination unit 1243 is configured to determine a fourth spine region of interest by taking the first intervertebral disc and the last intervertebral disc detected as boundaries.

In an example, the first initial detection unit 1241 may: select, a region of a given size surrounding each point (each of the two points) as an initial intervertebral disc region of interest; perform a gradient calculation on the initial intervertebral disc region of interest; then remove the parts not belonging to an intervertebral disc from the initial intervertebral disc region of interest based on, for example, limitations to gradient angles (for example, the gradient angle of a normal intervertebral disc is within a given range) and limitations to gradient magnitudes (for example, the gradient magnitude of a normal intervertebral disc is not less than a predetermined intensity); determine an initial intervertebral disc preferably according to one or more of the form information of an intervertebral disc, the position relationship between an intervertebral disc and each of the points input in the initial intervertebral disc regions of interest, and so on; and then remove the intervertebral disc not having the same form as a normal intervertebral disc and the intervertebral disc too far away from the input points. Then, by using information, for example, the position and the form, of the initial intervertebral disc (the first intervertebral disc) detected according to either of the two points, the first iterative detection unit 1242 iteratively detects a next intervertebral disc towards the direction of the other one of the two points until the other point is covered by the next intervertebral disc detected or by the surrounding areas of the next intervertebral disc detected, or until the next intervertebral disc detected overlaps with the initial intervertebral disc detected according to the other point. The spine region-of-interest determination unit 1243 can for example, a rectangle which takes the first intervertebral disc detected and the last intervertebral disc detected as its boundaries and has a specific aspect ratio as a fourth spine region of interest.

In another example, the first initial detection unit 1241 may: select a region of a given size surrounding each point (each of the two points) as an initial intervertebral disc region of interest, perform edge detection on the initial intervertebral disc region of interest; then remove the parts not belonging to an intervertebral disc from the initial intervertebral disc region of interest based on, for example, limitations to edge angles (for example, the edge angle of a normal intervertebral disc is within a given range) and limitations to edge magnitudes (for example, the edge magnitude of a normal intervertebral disc is not less than a predetermined intensity); determine an initial intervertebral disc preferably according to one or more of the form information of an intervertebral disc, the position relationship between an intervertebral disc and each of the points input in the initial intervertebral disc regions of interest, and so on; and then remove the intervertebral disc not having the same form as a normal intervertebral disc and the intervertebral disc too far away from the input points.

The foregoing embodiment of the fourth spine region-of-interest recognition unit 124 is merely illustrative and not to be construed as a limitation. The fourth spine region-of-interest recognition unit 124 can be implemented by those skilled in the art in a variety of ways under the teachings of the foregoing embodiments without departing the essence and scope of the present embodiment.

Figure 4:
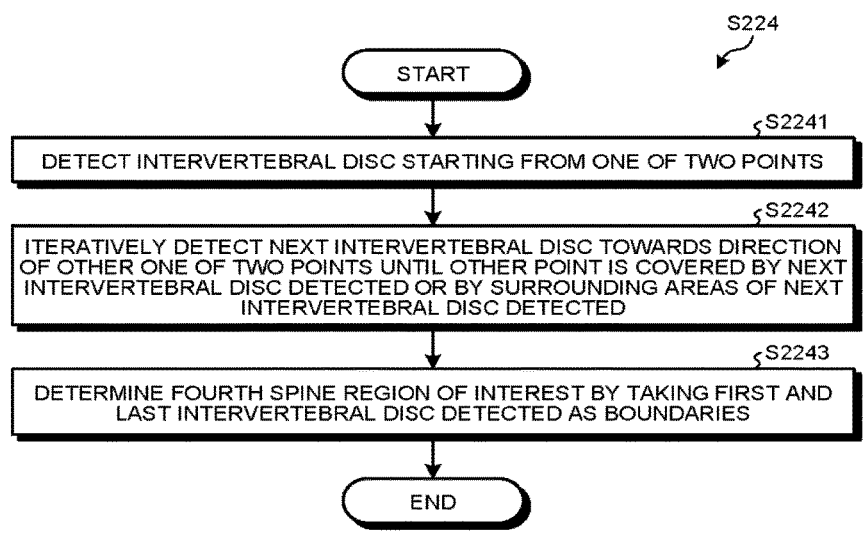
FIG. 4 is a flowchart schematically illustrating the working process of the fourth spine region-of-interest recognition unit shown in FIG. 3.

FIG. 4 is a flowchart illustrating the working process fourth spine region-of-interest recognition unit shown in FIG. 3, that is, a flowchart illustrating a procedure for determining a fourth spine region of interest according to an embodiment of the present invention. As shown in FIG. 4, in step S2241 in a procedure S224 for determining a fourth spine region of interest, an intervertebral disc is detected starting from one of the two points input by the user. In step S2242, a next intervertebral disc is iteratively detected towards the direction of the other one of the two points until the other point is covered by the next intervertebral disc detected or by the surrounding areas of the next intervertebral disc detected or until the next intervertebral disc detected overlaps with an initial intervertebral disc detected according to the other point. In step S2243, a fourth spine region of interest is determined by taking the first, intervertebral disc detected and the last intervertebral disc detected as boundaries. Step S2241 may be executed by the first initial detection unit 1241, step S2242 may be executed by the first iterative detection unit 1242, and step S2243 may be executed by the spine region-of-interest determination unit 1243. Specific details of each step of the procedure S224 for determining a fourth spine region of interest can be understood with reference to the description on each unit of the foregoing fourth spine region-of-interest recognition unit 124. Specific details of each step of the procedure S224 for determining a fourth spine region of interest are therefore not described here repeatedly.

By performing spine region-of-interest segmentation by taking two points input by the user as reference boundary positions, a user-needed spine region of interest can be obtained from which an unnecessary intervertebral disc is removed. That is, a user-needed spine region of interest can be determined because an intervertebral disc in which the user is not interested is not detected unnecessarily.

Furthermore, a time for taking images in detecting an intervertebral disc can be reduced because an intervertebral disc can be detected only with at least one image taken and two points specified on the image.

In the foregoing embodiments, the medical image processing apparatus 100A may comprise only the input unit 110, the fourth spine region-of-interest recognition unit 124, and the intervertebral disc detection unit 130 of the units shown in FIG. 1. In this case, the input unit 110 receives two points specified on a sagittal plane image; the fourth spine region-of-interest recognition unit 124 determines a fourth spine region of interest using the two points specified; and the intervertebral disc detection unit 130 detects an intervertebral disc by evaluating a luminance distribution within a region that includes the two points.

Figure 5:
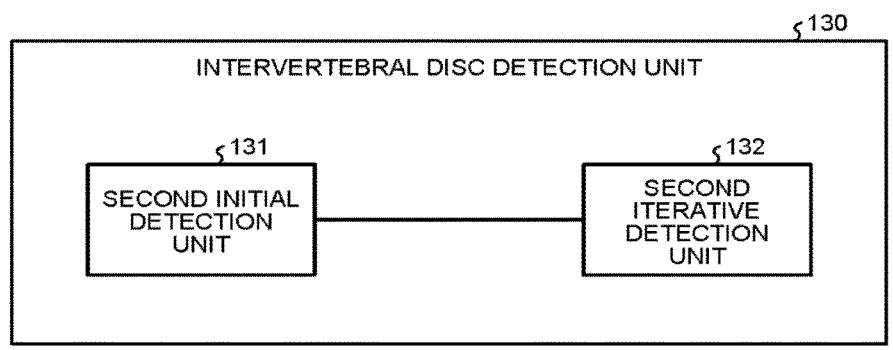
FIG. 5 is a block diagram schematically illustrating an intervertebral disc detection unit according to an embodiment.

In the foregoing embodiments, the intervertebral disc detection unit 130 may detect an intervertebral disc using various proper methods. As an example but not a limitation, in an embodiment of the present invention, the intervertebral disc detection unit 130 iteratively detects an intervertebral disc from the central part of a spine region of interest to two ends of the spine region of interest. FIG. 5 is a block diagram illustrating an intervertebral disc detection unit according to an embodiment. As shown in FIG. 5, an intervertebral disc detection unit 130 includes a second initial detection unit 131 and a second iterative detection unit 132.

The second initial detection unit 131 is configured to detect an intervertebral disc starting from the central part of a spine region of interest. In the central part of a spine region of interest, the features of an intervertebral disc, for example, the space between intervertebral discs and the horizontal projection of an intervertebral disc, are relatively stable, an initial intervertebral disc can be relatively accurately detected by detecting an intervertebral disc starting from the middle part of a spine region of interest. Here, the horizontal projection of the intervertebral disc is, for example, a luminance (signal value) distribution corresponding to an intervertebral disc in a sagittal plane image along a craniocaudal direction, and is obtained by calculating, with respect to each position along an axis in the craniocaudal direction, a sum of luminance values taken along an anterior-posterior direction. For example, an intervertebral disc located in the middle part of a spine region of interest can be detected using an existing intervertebral disc detection method. The middle part of a spine region of interest may be located in a predetermined area or at a predetermined position of the center of the spine region of interest.

The second iterative detection unit 132 is configured to iteratively detect a next intervertebral disc separately towards two ends of a spine region of interest until each end of the spine region of interest overlaps with the next intervertebral disc detected towards this end or be surrounding areas of the next intervertebral disc detected towards this end. Similarly, the next intervertebral disc can be iteratively detected according to the position information and the form information of a detected intervertebral disc.

Figure 6:
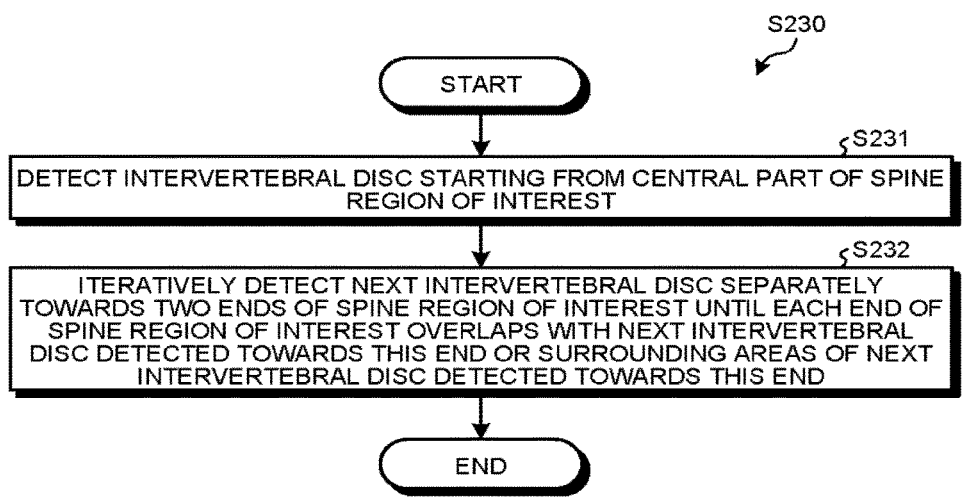
FIG. 6 is a flowchart illustrating the working process of the intervertebral disc detection unit shown in FIG. 5.

FIG. 6 is a flowchart illustrating the working process intervertebral disc detection unit shown in FIG. 5, that is, a flowchart illustrating an intervertebral disc detection procedure according to an embodiment of the present invention. As shown in FIG. 6, in step S231 in the intervertebral disc detection procedure S230, an intervertebral disc is detected starting from the central par of a spine region of interest. In step S232, a next intervertebral disc is iteratively detected separately towards two ends of the spine region of interest until each end of the spine region of interest overlaps with the next intervertebral disc detected towards this end or the surrounding areas of the next intervertebral disc detected towards this end. Step S231 may be executed by the second initial detection unit 131 and step S232 by the second iterative detection unit 132.

Specific details of each step of the intervertebral disc detection procedure S230 can be understood with reference to the description on each unit of the intervertebral disc detection unit 130. Specific details of each step of the intervertebral disc detection procedure S230 are therefore not described here repeatedly.

Figure 7:
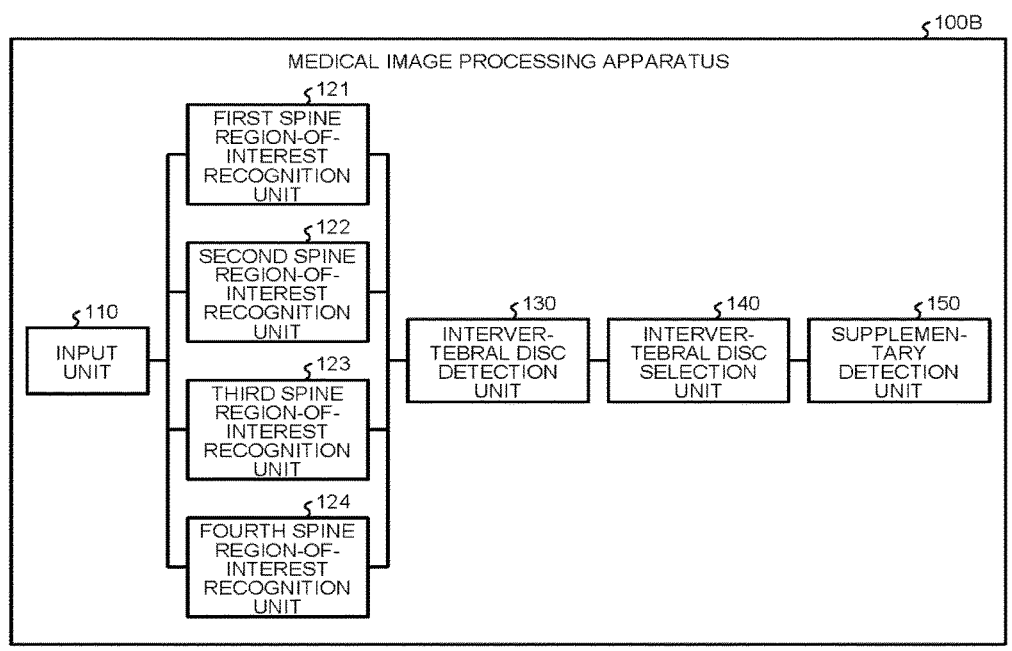
FIG. 7 a block diagram illustrating a medical image processing apparatus according to another embodiment.

In another embodiment, if no group of intervertebral disc meting the predetermined evaluation standard is detected in any of the first to the fourth spine regions of interest recognized, then an additional round of intervertebral disc detection may be carried out to obtain a desired intervertebral disc detection result. FIG. 7 is a block diagram illustrating a medical image processing apparatus according to still another embodiment. The medical image processing apparatus 1000 shown in FIG. 7 is different from the medical image processing apparatus 100A shown in FIG. 1 in that it further includes a supplementary detection unit 150. The supplementary detection unit 150 is configured to detect, by taking the two points input by the user as reference boundary positions, a group of intervertebral discs in sagittal plane image containing the two points as an intervertebral disc detection result if no group of intervertebral discs meeting the predetermined evaluation standard is detected in any of the first to the fourth spine regions of interest. The other units in the medical image processing apparatus 100B are the same as those in the medical image processing apparatus 100A and are therefore not described here repeatedly. As the supplementary detection unit 150 detects an intervertebral disc by taking two points input by the user as reference boundary positions, it is highly likely that a group of intervertebral discs meeting the predetermined evaluation standard can be detected. Owing to the use of the supplementary detection unit 150, the intervertebral disc detection procedure of the medical image processing apparatus according to the embodiment is more robust.

Figure 8:
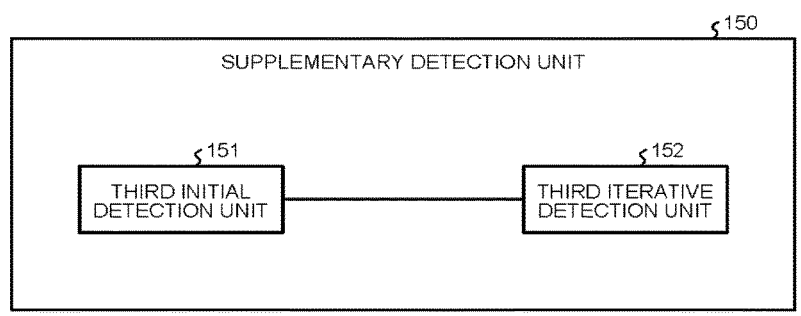
FIG. 8 is a block diagram illustrating a supplementary detection unit according to an embodiment.

As an example, FIG. 8 is a block diagram illustrating a supplementary detection unit according to an embodiment. As shown in FIG. 8, the supplementary detection unit 150 includes a third initial detection unit 151 and a third iterative detection unit 152. The third initial detection unit 151 is configured to detect an intervertebral disc starting from the position of one of the two point. The third iterative detection unit 152 is configured to iteratively detect a next intervertebral disc towards the direction of the other one of the two points until the other point is covered by the next intervertebral disc detected or by the surrounding areas of the next intervertebral disc detected. The third initial detection unit 151 and the third iterative detection unit 152 can implement the foregoing functions by using methods basically identical to those used by the first initial detection unit 1241 and the first iterative detection unit 1242. Therefore, any repeated description is omitted.

Figure 9:
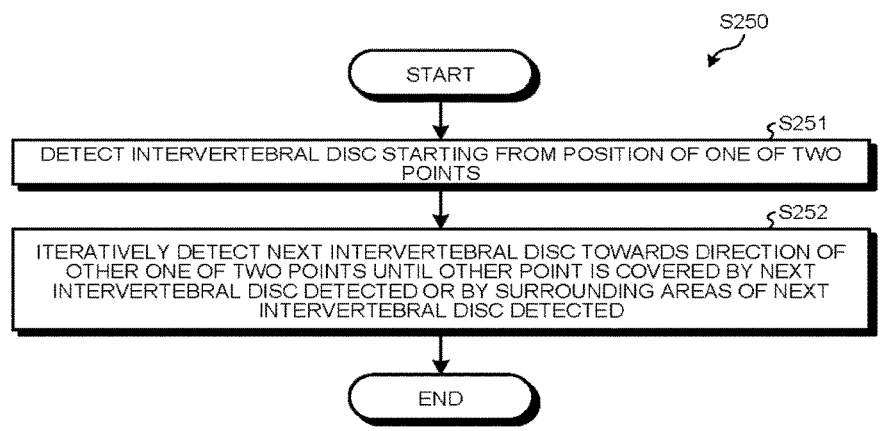
FIG. 9 is a flowchart illustrating the working process of the supplementary detection unit shown in FIG. 8.

FIG. 9 is a flowchart illustrating the working process supplementary detection unit shown in FIG. 8, that is, a flowchart illustrating a procedure for supplementary detection according to an embodiment. In the procedure S250 for supplementary detection, a group of intervertebral discs is detected from the sagittal plane image containing the two points as an intervertebral disc detection result by taking the two points as reference boundary positions. In step S251, an intervertebral disc is detected starting from the position of one of the two points. In step S252, a next intervertebral disc is iteratively detected towards the direction of the other one of the two points until the other point is covered by the next intervertebral disc detected or by the surrounding areas of the next intervertebral disc detected. Step S251 may be executed by the third initial detection unit 151 and step S252 by the third iterative detection unit 152. Specific details of each step of the procedure S250 for supplementary detection can be understood with reference to the description on each unit of the supplementary detection unit 150. Specific details of each step of the procedure S250 for supplementary detection are therefore not described here repeatedly.

Figure 10:
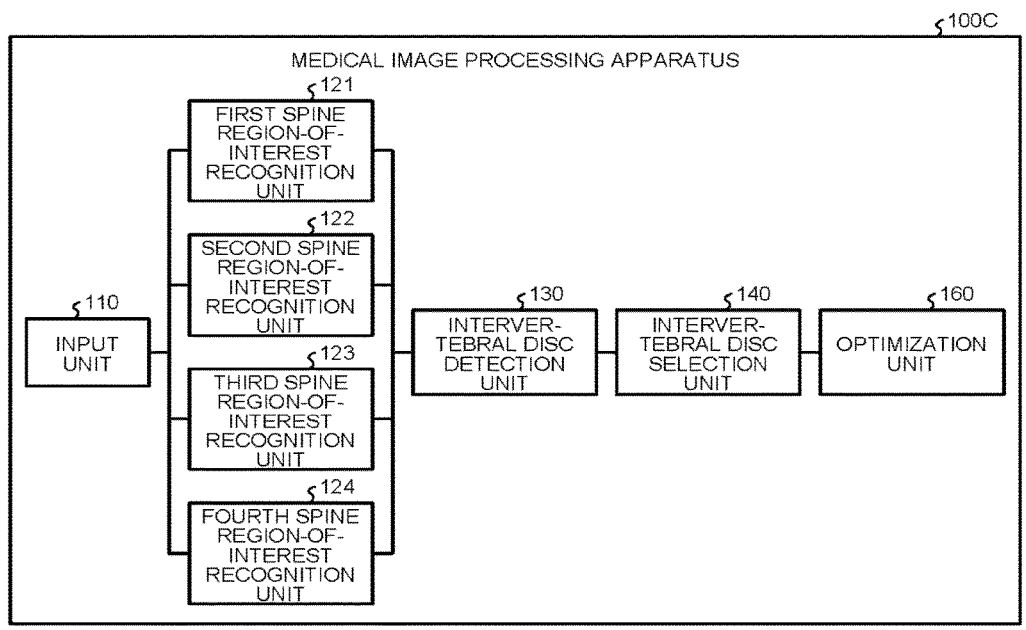
FIG. 10 is a block diagram illustrating a medical image processing apparatus according to still another embodiment.

In yet still another embodiment of the present invention, the intervertebral disc detection result obtained in each of the foregoing embodiments can be optimized to be more accurate. FIG. 10 is a block diagram illustrating a medical image processing apparatus according to yet still another embodiment. The medical image processing apparatus 1000 shown in FIG. 10 is different from the medical image processing apparatus 100A shown in FIG. 1 in that it further includes an optimization unit 160 for optimizing the intervertebral disc detection result. The other units in the medical image processing apparatus 100C are the same as those in the medical image processing apparatus 100A and are therefore not described here repeatedly.

Figure 11:
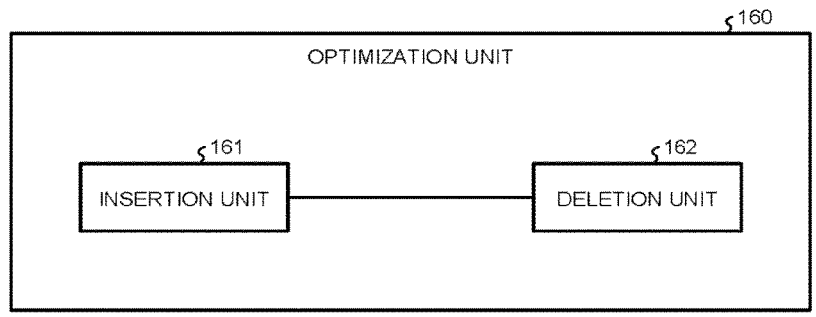
FIG. 11 is a block diagram illustrating an optimization unit according to an embodiment.

As an example, FIG. 11 is a block diagram illustrating an optimization unit according to an embodiment. As shown in FIG. 11, the optimization unit 160 includes: an insertion unit 161 configured to insert an intervertebral disc the detection of which is missed into the intervertebral disc detection result; and a deletion unit 162 configured to delete an unneeded intervertebral disc from the intervertebral disc detection result. Although the optimization unit 160 shown in FIG. 11 includes both the insertion unit 161 and the deletion unit 162, it should be appreciated that the optimization unit 160 may only include either of the insertion unit 161 and the deletion unit 162.

In an example of the embodiment, according to the distance between intervertebral discs, the insertion unit 161 determines and inserts an intervertebral disc the detection of which is missed. For example, if the distance between two intervertebral discs is longer than the average distance between intervertebral discs, then it can be determined that there is an intervertebral disc the detection of which is missed between the two intervertebral discs, and the intervertebral disc the detection of which is missed may be inserted by re-detecting the region between the two intervertebral discs or by setting, according to the position information and the form information of the two intervertebral discs, the position information and the form information of the intervertebral disc the detection of which is missed.

In another example of the embodiment, the deletion unit 162 may delete an unneeded intervertebral disc according to the range limited by the two points input by the user. For example, an intervertebral disc located outside of the range limited by the two points may be deemed as an unneeded intervertebral disc. For example, if the distance between two intervertebral discs is less than or equal to a predetermined value smaller than the average distance between intervertebral discs, then at least one of the two intervertebral discs can be considered as an incorrectly detected intervertebral disc, that is, an unneeded intervertebral disc.

Owing to the use of the optimization unit 160, the intervertebral disc detection result of the medical image processing apparatus according to the embodiment is more accurate, and an unnecessary intervertebral disc can be removed.

Figure 12:
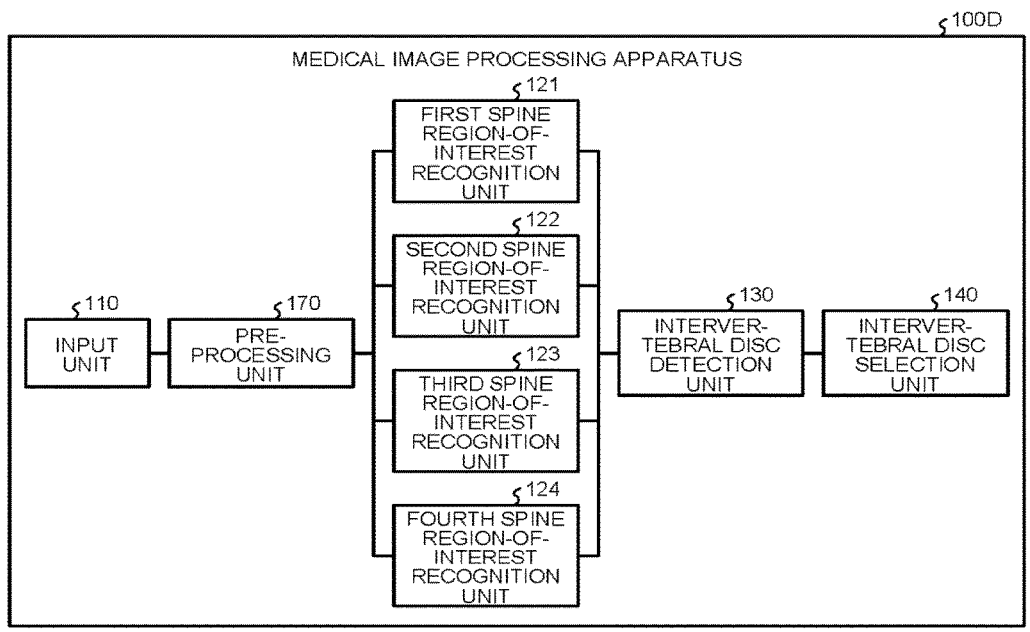
FIG. 12 is a block diagram illustrating a medical image processing apparatus according to yet another embodiment.

In another embodiment the present invention, the sagittal plane image on which two points are input by the user may be pre-processed so as to eliminate the factors causing interference to medical image processing such as spine region-of-interest recognition processing or intervertebral disc detection processing. FIG. 12 is a block diagram illustrating a medical image processing apparatus according to yet still another embodiment. The medical image processing apparatus 100D shown in FIG. 12 is different from the medical image processing apparatus 100A shown in FIG. 1 in that it further includes a pre-processing unit 170 configured to determine a body region of interest on the sagittal plane image on which two points are input by the user. The body region of interest represents a region of the sagittal plane image where a body is contained, that is, region of interest is a body region in a sagittal plane image. Generally, the part, for example, the fat part, of a body which may cause interference to medical image processing that is executed by units in stages after the pre-processing unit 170 is removed from the body region of interest. Those units include the first to fourth spine region-of-interest recognition units 121 to 124, the intervertebral disc detection unit 130, and the intervertebral disc selection unit 140. The pre-processing unit 170 determines the body region of interest in the sagittal plane image using any of existing proper technologies. Accordingly, the first, the second, and the third spine region-of-interest recognition units 121 to 123 can perform fully automatic spine region-of-interest segmentation in the body region of interest using the first, the second, and the third methods, respectively.

It should be appreciated that although the medical image processing apparatus and the medical image processing method according to the embodiments are described in the foregoing embodiments by taking a sagittal plane image as an example, the medical image processing apparatus and method according to the embodiments are also applicable to a coronal plane image obtained by scanning a human body. For example, two points input by the user on a coronal plane image can be used directly. Alternatively, the points on a coronal plane image which are corresponding to the points input by the user on a sagittal plane image may be found, and the medical image processing method according to the foregoing embodiments is used by taking the corresponding points as reference points, so that an intervertebral disc detection result on the coronal plane image is obtained.

The medical image processing apparatus and method according to the embodiments are described above with reference to the accompanying drawings. In the foregoing medical image processing apparatus and the foregoing medical image processing method, four groups of intervertebral discs are detected from four spine regions of interest determined through four rounds of recognition, and the one of the four groups of intervertebral discs which best meets a predetermined evaluation standard is selected as an intervertebral disc detection result. In the fourth round of recognition, a spine region of interest is segmented by taking two points input by the user as reference boundary positions. Therefore, the foregoing medical image processing apparatus and the foregoing medical image processing method are capable of detecting an intervertebral disc more accurately, so that a subsequently performed spine scan can be performed on an image of higher quality.

Moreover, not relying on the quality of an image, the medical image processing apparatus and the medical image processing method according to the embodiments can achieve substantially the same detection results on a high-definition image and a low-definition image.

Besides, as the medical image processing apparatus and the medical image processing method according to the embodiments take the points input by the user into consideration, unnecessary intervertebral discs which are not needed by the user can be partially removed to a certain extent.

Figure 13:
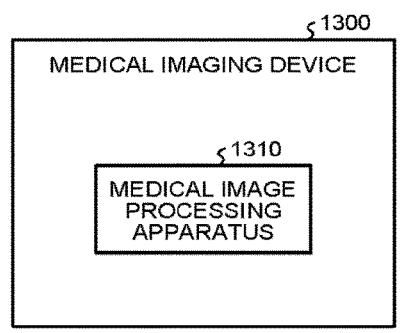
FIG. 13 is a block diagram illustrating a medical imaging device according to an embodiment.

FIG. 13 is a block diagram illustrating a medical imaging device according to an embodiment. In order not to obscure the essence and scope of the present embodiment, other members possibly included in the medical imaging device are omitted in FIG. 13. A medical imaging device 1300 includes a medical image processing apparatus 1310 for processing a medical image generated by the medical imaging device 1300. The medical image processing apparatus 1310 may be any of the medical image processing apparatuses 100A to 100D according to the foregoing embodiments. The medical imaging device 1300 may be, for example, a magnetic resonance imaging (MRI) device.

The specific way or manner in which the foregoing medical image processing apparatus is included in the medical imaging device 1300 is well known to those skilled in the art and is therefore not described repeatedly here.

As an example, each step of the foregoing medical image processing method and each component and/or each unit of the foregoing medical image processing apparatus may be implemented as software, firmware, hardware, or a combination thereof. In a case where the steps or components and/or units are implemented through software or firmware, software programs for the foregoing method can be installed on a computer having a dedicated hardware structure (e.g., a universal computer 1400 shown in FIG. 14) from a memory medium or via a network to be executed, and various functions can be executed with such various programs installed on the computer.

Figure 14:
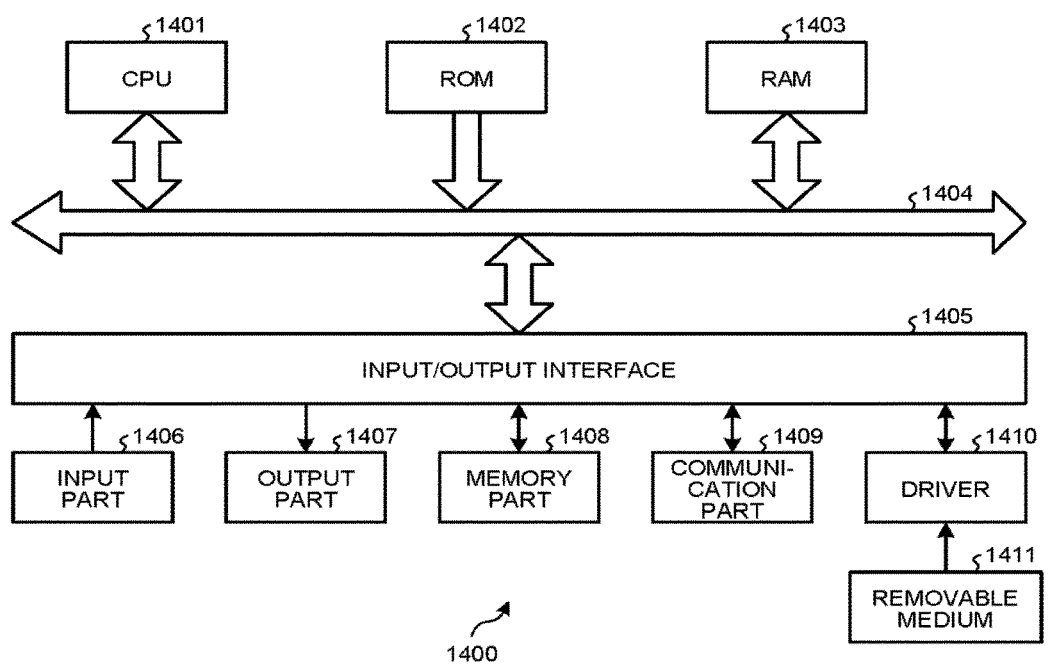
FIG. 14 is a block diagram exemplifying components of a computer capable of implementing embodiments.

FIG. 14 is a block diagram exemplifying components of a computer capable of implementing embodiments. In FIG. 14, a central processing unit (CPU) 1401 executes various processing according to the programs stored in a read only memory (ROM) 1402 or the programs loaded to a random access memory (RAM) 1403 from a memory part 1408. The data needed by the CPU 1401 to execute various processing may be stored in the RAM 1403, if needed. The CPU 1401, the ROM 1402 and the RAM 1403 are linked with each other via a bus 1404 with which an input/output interface 1405 is also connected.

The following parts are linked with the input/output interface 1405: an input part 1406 (including a keyboard, a mouse and the like), an output part 1407 (including a display such as a cathode ray tube (CRT) or a liquid crystal display (LCD), and a loudspeaker), the memory part 1408 (including a hard disk and the like) and a communication part 1409 (including a network interface card, such as a LAN card, and a modem). The communication part 1409 carries out a communication processing via a network such as the Internet. A driver 1410 can also be linked with the input/output interface 1405, if needed. A removable medium 1411, for example, a magnetic disc, an optical disc, a magnetic optical disc, a semiconductor memory or the like, may be installed as needed in the driver 1410, which reads a computer program therefrom and installs the read computer program in the memory part 1408.

In the case where the foregoing series of processing is executed through software, programs forming the software may be installed from a network such as the Internet or a memory medium such as the removable medium 1411.

It is obvious to those skilled in the art that the memory medium in which programs are stored and which is separated from the apparatus and distributed to provide the programs for users is not limited to the removable medium 1411. The removable medium 1411 may be, for example, a magnetic disc (such as a floppy disc (registered trademark)), an optical disc (such as a compact disc (CD)-ROM or a digital video disk (DVD)), a magnetic optical disc (such as a mini disc (MD) (registered trademark)), or a semiconductor memory. Alternatively, the memory medium may be the ROM 1402 or may be configured as a hard disk included in the memory part 1408, in such a manner that programs are stored in the memory mediums and can be distributed to users from an apparatus in which the memory medium is contained.

The present embodiment further provides a program product in which machine-readable instruction codes are stored. The medical image processing method according to an embodiment is executed when the instruction codes are read and executed by a machine.

A memory medium containing a program product in which machine-readable instruction codes are stored also falls within the scope of the present embodiment. Examples of memory medium include, but are not limited to, a soft disc, an optical disc, a magnetic optical disc, a memory card, and a memory stick.

In the foregoing description of the specific embodiments, any component described and/or shown for one of the embodiments can be used in one or more other implementation modes in the same or like way, can be combined with other implementation modes in the same way, or can be replaced with a component of another one of the embodiments.

It should be emphasized that the terms "comprise/include", as used herein, refer to the presence of a feature, a component, a step, or a part but do not preclude the presence or addition of one or more other features, components, steps or parts.

In the above-described embodiments, each step and/or each component are/is represented with a reference sign consisting of figures. It should be understood by those of ordinary skill in the art that the reference signs are merely intended to facilitate description and drawing but are not to be construed as limiting an order or any other aspect.

Furthermore, the methods of the present embodiments are not limited to being executed according to the time sequence described in the detailed description but may be executed sequentially, synchronously or independently according to another time sequence. Therefore, the implementation order of the methods described in the detailed description of the present embodiments not to be construed as limiting the technical scope of the present embodiments.

In accordance with at least one of the foregoing embodiments, an intervertebral disc can be more accurately detected.

Although several embodiments of the present invention have been described, these embodiments are presented by way of example, and are not intended to limit the scope of the invention. These embodiments can be implemented in various other forms, and various omissions, substitutions, and alterations can be made thereto without departing from the spirit of the invention. These embodiments and their modifications as would fall within the scope and spirit of the invention are intended to be within the invention and the scope of its equivalents as set forth in the appended claims.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
   reception circuitry configured to receive two points specified on at least one image;
   first determination circuitry configured to determine a first spine region of interest by performing, on the image, segmentation to extract a spine as a region of interest using a first method;
   second determination circuitry configured to determine a second spine region of interest by performing, on the image, segmentation to extract a spine as a region of interest using a second method;
   third determination circuitry configured to determine a third spine region of interest by performing, on the image, segmentation to extract a spine as a region of interest using a third method;
   fourth determination circuitry configured to determine a fourth spine region of interest by performing, on the image, segmentation to extract a spine as a region of interest by taking the two points as reference boundary positions;
   detection circuitry configured to detect a group of intervertebral discs in each of the first to the third spine regions of interest, and detect a group of intervertebral discs by evaluating a luminance distribution within a region that is in the fourth spine region of interest and that includes the two points; and
   intervertebral disc selection circuitry configured to select one of the groups of intervertebral discs detected by the detection circuitry and best meeting a predetermined evaluation standard as an intervertebral disc detection result.

2. The medical image processing apparatus according to claim 1, wherein the fourth determination circuitry comprises:
   first initial detection circuitry configured to detect an intervertebral disc from the position of one of the two points;
   first iterative detection circuitry configured to iteratively detect a next intervertebral disc towards a direction of the other one of the two points until the other point is covered by a intervertebral disc detected or by surrounding areas of the intervertebral disc detected; and
   spine region of interest determination circuitry configured to determine the fourth spine region of interest by taking a first intervertebral disc detected and a last intervertebral disc detected as boundaries.

3. The medical image processing apparatus according to claim 2, wherein the first iterative detection circuitry iteratively detects the next intervertebral disc according to position information and form information of an intervertebral disc detected.

4. The medical image processing apparatus according to claim 1, wherein
   the first determination circuitry estimates an intervertebral disc in the image according to angular limitations to intervertebral discs and determines the first spine region of interest in the image using vertical projection of the estimated intervertebral disc;
   the second determination circuitry determines the second spine region of interest by adjusting the first spine region of interest according to a position relationship between predetermined parts of the first spine region of interest; and
   the third determination circuitry detects a spinal canal in the image and determines the third spine region of interest in the image based on the detected spinal canal and a position relationship between the intervertebral disc and the spinal canal.

5. The medical image processing apparatus according to claim 1, wherein the detection circuitry comprises:
   second initial detection circuitry configured to detect an intervertebral disc starting from a central part of each of the first to fourth spine regions of interest; and
   second iterative detection circuitry configured to iteratively detect a next intervertebral disc separately towards two ends of each of the first to fourth spine regions of interest until each end is overlapped with the intervertebral disc detected or surrounding areas of the intervertebral disc detected.

6. The medical image processing apparatus according to claim 5, wherein the second iterative detection circuitry iteratively detects the next intervertebral disc according to position information and form information of an intervertebral disc detected.

7. The medical image processing apparatus according to claim 1, further comprising:
supplementary detection circuitry configured to detect, by taking the two points as reference boundary positions, a group of intervertebral discs in the image as the intervertebral disc detection result if no group of intervertebral discs meeting the predetermined evaluation standard is detected in any of the first to the fourth spine regions of interest.

8. The medical image processing apparatus according to claim 7, wherein the supplementary detection circuitry comprises:
third initial detection circuitry configured to detect an intervertebral disc starting from the position of one of the two points; and
third iterative detection circuitry configured to iteratively detect a next intervertebral disc towards a direction of the other one of the two points until the other point is covered by the intervertebral disc detected or by surrounding areas of the intervertebral disc detected.

9. The apparatus according to claim 8, wherein the third iterative detection circuitry iteratively detects the next intervertebral disc according to position information and form information of an intervertebral disc detected.

10. The medical image processing apparatus according to claim 1, further comprising:
optimization circuitry configured to optimize the intervertebral disc detection result, wherein the optimization circuitry comprises at least one of:
insertion circuitry configured to insert an intervertebral disc the detection of which is missed into the intervertebral disc detection result; and
deletion circuitry configured to delete an unneeded intervertebral disc from the intervertebral disc detection result.

11. The medical image processing apparatus according to claim 10, wherein
according to a distance between intervertebral discs, the insertion circuitry determines and inserts the intervertebral disc the detection of which is missed, and
the deletion circuitry deletes the unneeded intervertebral disc according to a range defined by the two points.

12. The medical image processing apparatus according to claim 1, further comprising:
pre-processing circuitry configured to determine a body region of interest on the image, wherein
the first determination circuitry performs, on the image, segmentation to extract the spine as the region of interest using the first method in the body region of interest,
the second determination circuitry performs, on the image, segmentation to extract the spine as the region of interest using the second method in the body region of interest, and
the third determination circuitry performs, on the image, segmentation to extract the spine as the region of interest using the third method in the body region of interest.

13. A medical imaging device, comprising a medical image processing apparatus comprising:
reception circuitry configured to receive two points specified on at least one image;
first determination circuitry configured to determine a first spine region of interest by performing, on the image, segmentation to extract a spine as a region of interest using a first method;
second determination circuitry configured to determine a second spine region of interest by performing, on the image, segmentation to extract a spine as a region of interest using a second method;
third determination circuitry configured to determine a third spine region of interest by performing, on the image, segmentation to extract a spine as a region of interest using a third method;
fourth determination circuitry configured to determine a fourth spine region of interest by performing, on the image, segmentation to extract a spine as a region of interest by taking the two points as reference boundary positions;
detection circuitry configured to detect a group of intervertebral discs in each of the first to the third spine regions of interest, and detect a group of intervertebral discs by evaluating a luminance distribution within a region that is in the fourth spine region of interest and that includes the two points; and
intervertebral disc selection circuitry configured to select one of the groups of intervertebral discs detected by the detection circuitry and best meeting a predetermined evaluation standard as an intervertebral disc detection result.

14. A medical image processing method, comprising:
receiving two points specified on at least one image;
first determining a first spine region of interest by performing, on the image, segmentation to extract a spine as a region of interest using a first method;
second determining a second spine region of interest by performing, on the image, segmentation to extract a spine as a region of interest using a second method;
third determining a third spine region of interest by performing, on the image, segmentation to extract a spine as a region of interest using a third method;
fourth determining a fourth spine region of interest by performing, on the image, segmentation to extract a spine as a region of interest by taking the two points as reference boundary positions;
detecting a group of intervertebral discs in each of the first to the third spine regions of interest, and detecting a group of intervertebral discs by evaluating a luminance distribution within a region that is in the fourth spine region of interest and that includes the two points; and
selecting one of the groups of intervertebral discs and best meeting a predetermined evaluation standard as an intervertebral disc detection result.

* * * * *